Aug. 14, 1945.
J. P. LAWLOR
2,382,490
METHOD AND APPARATUS FOR TREATING WATER
Filed Dec. 22, 1939
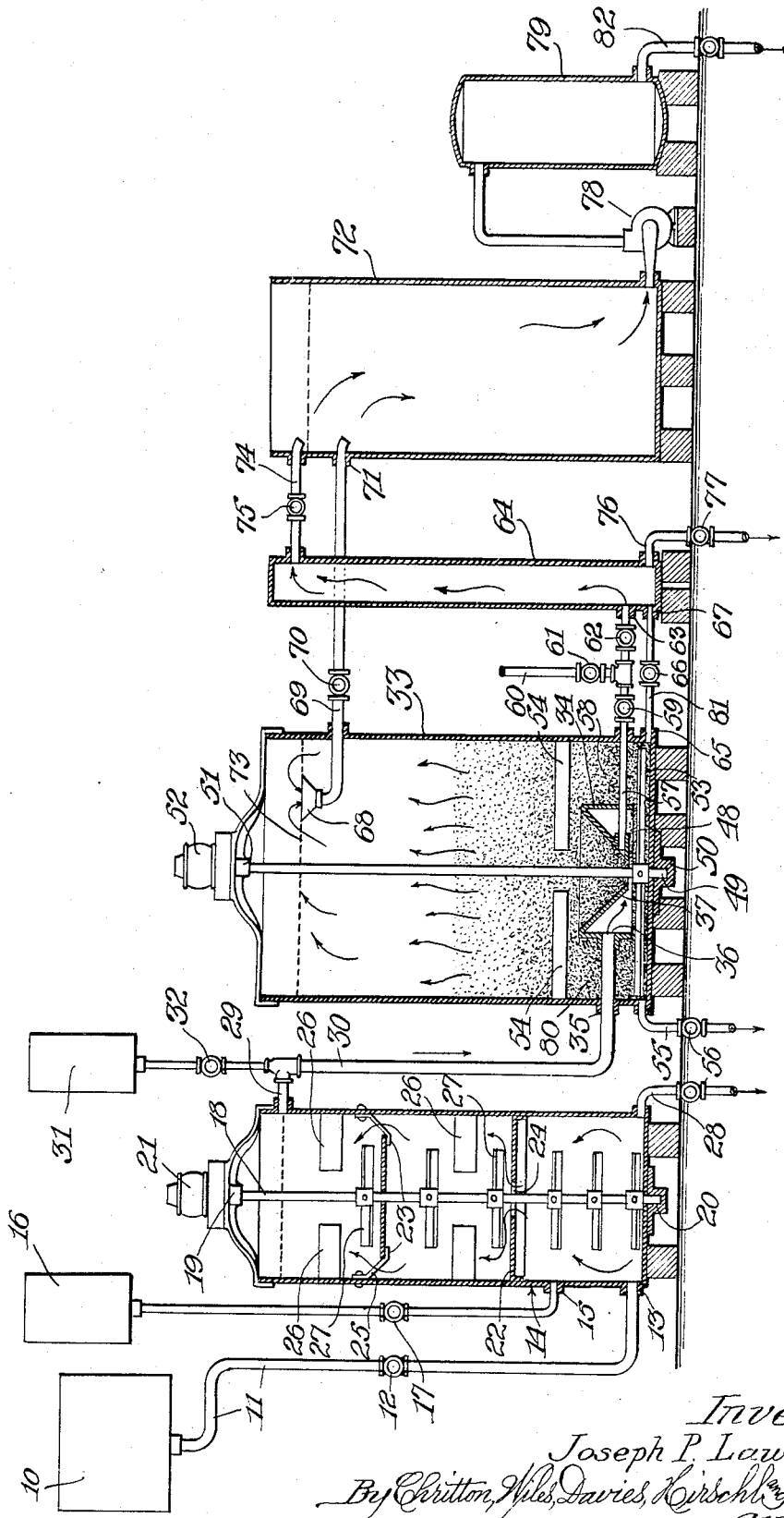
Inventor:
Joseph P. Lawlor,
By Critton, Wiles, Davies, Hirschl & Dawson,
Attys Patented Aug. 14, 1945

2,382,490

UNITED STATES PATENT OFFICE 2,382,490

METHOD AND APPARATUS FOR TREATING WATER

Joseph P. Lawlor, Ames, Iowa

Application December 22, 1939, Serial No. 310,657

6 Claims. (Cl. 210—16)

This invention relates to a method and apparatus for treating water and more particularly to water softening and purification.

An object of this invention is to provide for the continuous treatment of water to effect the purification and softening thereof, the water and treating material being intimately and thoroughly mixed and the sludge formed being kept in effective suspension by slight mechanical agitation. Another object is to provide a method and apparatus by means of which the sludge produced by the interaction with a precipitating agent may be used for the further treatment of the water. Still another object of this invention is to provide for the removal from the treating mixture of the portions of the sludge which become ineffective for further treatment. Yet another object is to concentrate the sludge formed in the water treatment and to remove the same with a loss of a minimum amount of water. A further object is to provide a method and apparatus which is effective for water treatment. Another object is to provide for the mixing of a precipitating agent with water and the uniform distribution of the precipitating agent therethrough.

Other objects and advantages will be apparent from the following specification and drawing, in which the drawing shows a side elevational view, partly in section, of a specific embodiment of my invention.

In the specific embodiment of my invention shown herein, the water to be treated is passed through an aerator 10, which is of well known construction and need not be described specifically herein. From the aerator 10, the water passes through the pipe 11 past the valve 12 and through the inlet 13 into the bottom of the mixing tank 14. Above the inlet 13, the tank 14 is provided with a second inlet 15, through which may be introduced lime, soda ash, or other suitable precipitating agent from the container 16. The flow of this precipitating agent may be controlled by the valve 17, which may be, if desired, automatic.

The mixing tank 14 is preferably constructed in the form of a vertically extending cylinder, and is provided with a rotatable shaft 18 centrally disposed within the tank and supported by the bearings 19 and 20. A motor 21, mounted on the top of the tank, serves to rotate the shaft 18.

The tank 14 is also provided with horizontal baffles 22 and 23 extending across the interior of the tank. The baffle 22 may be in the form of a flat annular plate secured to the sides of the tank 14 and having in its center an opening 24 through which the water may pass. The baffle 23, on the other hand, may be a disk, which is fitted tightly around the shaft 18 and extends outwardly to a point near the sides of the tank. Straps 25 serve as a mounting for the baffle 23 and permit the water to flow along the side of the tank outside the baffle 23.

The vertical baffles 26 may also be arranged within the tank 14 and preferably extend inwardly from the sides of the tank. The rotatable shaft 18 carries a series of agitator blades 27 which are spaced between the baffles 22, 23 and 26.

An outlet 28 is provided in the lower portion of the tank for the purpose of draining the same. In addition, an overflow outlet 29 joins the upper portion of the tank with the pipe 30.

After the water and the precipitating agent are thoroughly mixed in the tank 14, the mixture is withdrawn through the outlet 29 and flows through the pipe 30 to the settling tank 33. Alum or other suitable coagulating agent may be introduced into the mixture through the pipe 30, the valve 32 being provided to control the flow of this material.

The settling tank 33 is preferably cylindrical in shape and receives in its interior a hollow inverted drum 34, which is centrally located within the tank and spaced a short distance from the bottom thereof. The sides of the drum are spaced from the sides of the tank in order to provide a vertical passage 80 therebetween. The drum may be supported within the tank by any suitable mounting (not shown).

The pipe 30 passes through the tank inlet 35 and drum inlet 36, thereby delivering the water mixture to the interior of the drum. Since the bottom of the drum is open, any water delivered to the interior of the drum may readily flow into the lower portion of the settling tank 33.

The top of the drum 34 is closed, and may be so constructed as to provide a recess 37. The recess 37 is preferably in the form of an inverted cone in which the sides of the recess extend downwardly and inwardly from the top of the drum. An outlet 48 communicates with the lower portion of the recess 37. The top of the drum 34 is also provided with an opening through which the vertical shaft 49 passes.

The shaft 49 is rotatably supported by the bearings 50 and 51 and is connected to the motor 52. The lower end of the shaft carries an agitator blade 53 which is positioned between the bottom of the tank 33 and the drum 34. Vertical baffles 54, extending inwardly from the sides of the tank 33, help to prevent rotation of the water within the tank when the agitator blade 53 is moved.

The tank 33 is equipped at its lower end with an outlet 55 controlled by valve 56. The outlet 48, communicating with the recess 37, is connected to the pipe 57 which passes through a tank outlet and across to the concentrating tank 64. Valves 59, 61 and 62 control the flow through the pipe 57. Another pipe 60, communicating with a source of water supply, is joined to the pipe 57 intermediate of the settling tank 33 and the concentrating tank 64. Another outlet 65 furnishes a connection for the pipe 61 which extends to an inlet 67 in the concentrating tank 64. A valve 66 controls the flow of liquid through this latter pipe.

In the upper portion of the settling tank an overflow outlet 68 receives water and delivers the same through the pipe 69 and valve 70 to the inlet 71 in the storage tank 72. Thus when the water in the settling tank 33 rises to the level indicated at 73, it will pass into the overflow outlet and be delivered into the storage tank 72.

The concentrating tank 64 may consist of an elongated cylinder, preferably of relatively small cross sectional area, and is provided with the inlets 63 and 67 already referred to. The upper portion of the concentrating tank 64 communicates with a pipe 74 through which water must be delivered to the storage tank 72. A valve 75 controls the flow of water through the pipe 74. The concentrating tank 64 is also equipped at its lower portion with an outlet 76 controlled by the valve 77.

The storage tank 72 may be of any suitable construction. From this storage tank, the water may be delivered to a pump 78 and a filter 79 of well known construction. The water withdrawn from the filter 79 to the pipe 82 is ready for use.

In operation, the water from aerator 10 is introduced into the mixing tank 14 through the inlet 13 in the lower portion of the tank. Lime, soda ash, or other chemical precipitating agent may be simultaneously introduced into the mixing tank 14 through the inlet 15, this latter inlet being located slightly above the inlet 13. The water and the precipitating agent are agitated within the tank 14 by the rotation of the blades 27 driven by the motor 21.

In order to flow upwardly through the tank, it is necessary for the water to pass through the central opening 24 in the baffle 22 and through the peripheral openings 25 around the edge of the baffle 23. The vertical baffles 26 prevent any substantial rotation of the mixture within the tank.

As a result of the agitation of the water and precipitating agent within the tank and the baffle construction provided therein, these substances are thoroughly mixed as they flow upwardly to the outlet 29.

By introducing the chemicals to the tank at a point above the water inlet, I have found that beneficial results may be achieved. The water, upon its introduction to the tank, is first exposed to the precipitating agent which is mixed with the water already present. After flowing upwardly through the tank to the level of the inlet 15, the water is brought into contact with the fresh precipitating agent. The fresh precipitating agent is then thoroughly mixed with the water as it flows on upwardly to the outlet 29.

A suitable coagulating agent, such as alum, is added to the water in the pipe 30, being delivered from the storage container 31.

The mixture of water, precipitating agent and coagulating agent is introduced into the settling tank 33 through the inlet 35 of the tank and inlet 36 of the drum 34. The mixture is thus received within the interior of the drum 34 and flows downwardly around the lower edges of the drum to the bottom of the tank 33. The mixture is thus delivered from the drum 34 to the bottom of the vertical passages 80 in the lower portion of the tank 33.

As the precipitating agent and coagulating agent react with the water, a precipitate is formed which combines with the chemicals to produce a sludge. This sludge is of such a character that it will remain suspended in the water for a substantial period of time and will settle to the bottom only at a very slow rate. As the water flows upwardly through the passage 80, the sludge forms a blanket through which the water is filtered.

For the purpose of convenience, I will hereafter refer to the mixture of precipitating agent and precipitate, whether with or without a coagulating agent as sludge.

During the operation of the device, the agitator blade 53 is slowly rotated by the motor 52, causing the stirring of any sludge which may settle in the bottom of the tank. The baffles 54 help to prevent any substantial rotation of the water within the tank. The upward flow of the water in the tank carries the sludge upwardly to such an extent that the sludge blanket will normally extend to about the vertical center of the tank.

As the reaction proceeds, the sludge, which has remained in the water for a substantial period of time, tends to be moved to a point above the inlet area formed by the passage 80. The sludge in the portion of the tank above the passage 80 may settle into the settling area provided by the recess 37 and from this position may be withdrawn to the concentrating tank 64.

I have found that after the sludge has remained suspended in the water for a substantial period of time, it tends to lose its effectiveness as a filtering agent. It is, therefore, highly desirable to remove from the body of water the sludge which is found above the inlet area or vertical passage 80. The fresh sludge will, of course, be concentrated in the vertical passage 80 and will gradually be carried upwardly in the body of water to a point where it may settle into the recess 37.

Any excess sludge which may be collected in the bottom of the tank 33 may be removed to the concentrating tank 64 through the pipe 61.

The treated water, which rises to the top of the tank 33, is withdrawn through the overflow outlet 68 and delivered to the storage tank 72.

A mixture of sludge and water are introduced into the concentrating tank 64 through the inlets 63 and 67. Since these inlets are located in the lower portion of the concentrating tank, the mixture flows upwardly within the tank. The sludge being heavier than the water tends to settle out, and purified or treated water is delivered to the outlet in the upper portion of the tank.

The sludge water mixture may be introduced into the concentrating tank 64 until the sludge is finally carried to the upper portion of the tank. At this point, the valve 75 and the valves 62 and 66 may be closed and the concentrated sludge mixture withdrawn from the tank through the outlet 76.

The concentrator may be operated either continuously or intermittently, except that in the continuous operation it is necessary to stop the introduction of the sludge mixture long enough to drain the concentrating tank. In the intermittent operation, the sludge water mixture may be introduced into the concentrating tank 64 and maintained in a quiescent stage until the sludge has settled at the bottom of the tank. At this time, the sludge may be withdrawn through the outlet 76.

When it is desired to operate the water treating equipment after it has been shut down for a substantial period of time, the valve 62 may be closed and the valve 61 opened to permit water to flow through the pipes 60 and 57 into the bottom of the recess 37. The flow of this water will cause the sludge in the recess 37 to rise in the main body of water and to be dispersed therethrough, thus quickly creating a sludge blanket which will be effective as a filtering and pumping agent.

As soon as the sludge is distributed throughout the body of water, the valve 61 may be closed and the flow of water through the aerator 10 and mixer 14 begun. In this manner, the time required to bring the apparatus into effective operation may be greatly reduced.

When it is desired to clean the apparatus, the tanks may be drained through the outlets 28, 55 and 76.

While there are shown and described certain embodiments of the invention, it is to be understood that it is capable of many modifications. Changes, therefore, in the construction and arrangement may be made without departing from the spirit and scope of the invention as disclosed in the appended claims, in which it is intended to claim all novelty inherent in the invention as broadly as permissible, in view of the prior art.

I claim:

1. A method for treating water which comprises maintaining a body of water, introducing a small amount of water into a settling area in the lower portion of said body of water to disperse a precipitating agent throughout said body of water, introducing a mixture of raw water and a precipitating agent into said body through a small inlet area in the lower portion of the body below the portion thereof communicating with the settling area, collecting in the settling area the precipitating agent and precipitate from the body of water above said inlet area, withdrawing the collected precipitate and precipitating agent, withdrawing from the lower portion of said inlet area excess precipitating agent, and withdrawing treated water from the upper portion of said body.

2. A method for treating water which comprises maintaining a body of water, introducing raw water and a precipitating agent into the lower portion of said body, withdrawing treated water from the top of said body of water, withdrawing a mixture of water, precipitate and the precipitating agent from the lower portion of said body, passing said mixture through an inlet into the lower portion of a second and separate body of water, said second body of water being in communication with said first-mentioned body only through said inlet, withdrawing treated water from the upper portion of said second body, and withdrawing the precipitate and precipitating agent from the lower portion of said second body.

3. In apparatus of the character set forth for the treating of water, a settling tank, an inverted drum centrally disposed within said tank and having an open lower end with the lower edge of the drum spaced from the bottom of said tank to provide communication between the interior of said drum and said tank, said drum being spaced from the sides of the tank to provide a substantially vertical flow passage between said drum and said tank, the upper end of said drum being closed and being recessed to provide means for collecting sludge from the portion of the tank above said passage, means for introducing raw water and a precipitating agent into the interior of said drum, means for agitating the mixture within said tank, baffle means for preventing rotation of the mixture, an outlet in the upper portion of the tank for removing treated water, means for removing sludge from the recessed portion of said drum, and means for removing sludge from the lower portion of said passage.

4. In apparatus of the character set forth for the treating of water, a mixing tank, an inlet in the lower portion of said tank for introducing water, a second inlet in the lower portion of said tank and above said first-mentioned inlet for introducing a precipitating agent, rotary stirring means for agitating the mixture in said tank, vertical and horizontal baffle means for preventing substantial rotation of the mixture in said tank, and an outlet in the upper portion of said tank for withdrawing said mixture.

5. A method for treating water which comprises maintaining a body of water with a precipitating agent suspended therein, introducing raw water into said body through an inlet in the lower portion thereof, introducing additional quantities of precipitating agent into the lower portion of said body above said raw water inlet, stirring with a rotary motion the mixture of water and precipitating agent, passing the mixture upwardly through vertical and horizontal baffle means disposed within said body of water whereby the baffle means cooperate with the stirring of the mixture to produce agitation thereof while preventing substantial rotation of the mixture, and withdrawing the mixture of water and precipitating agent from the upper portion of said body.

6. In combination with means for mixing water with a precipitating agent, a settling tank, means for introducing the mixture of water and precipitating agent into the settling tank for removing sludge from the mixture, an outlet in the upper portion of the settling tank for withdrawing treated water therefrom, an outlet in the lower portion of the settling tank for withdrawing sludge containing water therefrom, a concentrating tank, means for introducing the sludge containing water withdrawn from the settling tank into the lower portion of said concentrating tank, an outlet in the upper portion of said concentrating tank for withdrawing water, an outlet in the lower portion of said concentrating tank for withdrawing therefrom the entire mixture within the tank including the concentrated sludge, and a valve for controlling said outlet.

JOSEPH P. LAWLOR.